(12) United States Patent
Ouchi et al.

(10) Patent No.: US 7,084,192 B2
(45) Date of Patent: Aug. 1, 2006

(54) POLYLACTIC ACID COMPOSITE MATERIAL AND MOLDED BODY

(75) Inventors: Makoto Ouchi, Nisshin (JP); Hirotaka Okamoto, Aichi (JP); Mitsuru Nakano, Nagoya (JP); Hisato Takeuchi, Chita (JP); Arimitsu Usuki, Nagoya (JP); Takeshi Kanamori, Nagoya (JP); Hiroshi Urayama, Aichi (JP); Hisashi Okuyama, Aichi (JP); Takashi Inou, Toyota (JP); Yasumitsu Isobe, Susono (JP)

(73) Assignees: Kabushiki Kaisha Toyota Chuo Kankyusho, Aichi-gun (JP); Toyota Jidosha Kabushiki Kaisha, Toyota (JP)

( * ) Notice: Subject to any disclaimer, the term of this patent is extended or adjusted under 35 U.S.C. 154(b) by 72 days.

(21) Appl. No.: 10/618,761

(22) Filed: Jul. 15, 2003

(65) Prior Publication Data
US 2004/0054051 A1    Mar. 18, 2004

(30) Foreign Application Priority Data
Jul. 16, 2002    (JP)    ............... P2002-207250

(51) Int. Cl.
*C08K 5/20*    (2006.01)
(52) U.S. Cl. ............... 523/205; 524/210; 524/211; 524/224; 524/445; 524/451
(58) Field of Classification Search ............... 523/205; 524/210, 211, 224, 445, 451
See application file for complete search history.

(56) References Cited

U.S. PATENT DOCUMENTS 5,691,424 A * 11/1997 Suzuki et al. ............... 525/411
5,763,513 A * 6/1998 Suzuki et al. ............... 524/230
6,093,298 A * 7/2000 Kaylo et al. ............... 204/489
6,136,905 A   10/2000 Suzuki et al.
6,139,948 A * 10/2000 Kobayashi et al. ......... 428/331
6,417,294 B1   7/2002 Obuchi et al.
6,451,895 B1 * 9/2002 Topolkaraev et al. ....... 524/445
6,767,951 B1 * 7/2004 Nair et al. ............... 524/445
6,811,599 B1 * 11/2004 Fischer et al. ......... 106/287.17

FOREIGN PATENT DOCUMENTS

| JP | 6-299054 | 10/1994 |
|----|----------|---------|
| JP | 8-27363 | 1/1996 |
| JP | 8-183898 | 7/1996 |
| JP | 9-278991 | 10/1997 |
| JP | 10-81815 | 3/1998 |
| JP | 11-5849 | 1/1999 |
| JP | 2001-49098 | 2/2001 |
| JP | 2002-37987 | 2/2002 |
| JP | 2002-105298 | 4/2002 |
| JP | 2002-309074 | 10/2002 |
| JP | 2003-39428 | 2/2003 |

OTHER PUBLICATIONS

Patent Abstracts of Japan, English Abstract of 2002-309074.

* cited by examiner

*Primary Examiner*—Bernard Lipman
(74) *Attorney, Agent, or Firm*—Oblon, Spivak, McClelland, Maier & Neustadt, P.C.

(57) ABSTRACT

The polylactic acid composite material of the present invention comprises a polylactic acid, a low molecular weight compound which has an amide group, and a layered clay mineral that is organically modified by means of an organic onium salt. As a result, a polylactic acid composite material that has a sufficiently rapid crystallization rate, and that is superior in terms of heat resistance, moldability and mold release characteristics can be obtained.

19 Claims, 1 Drawing Sheet

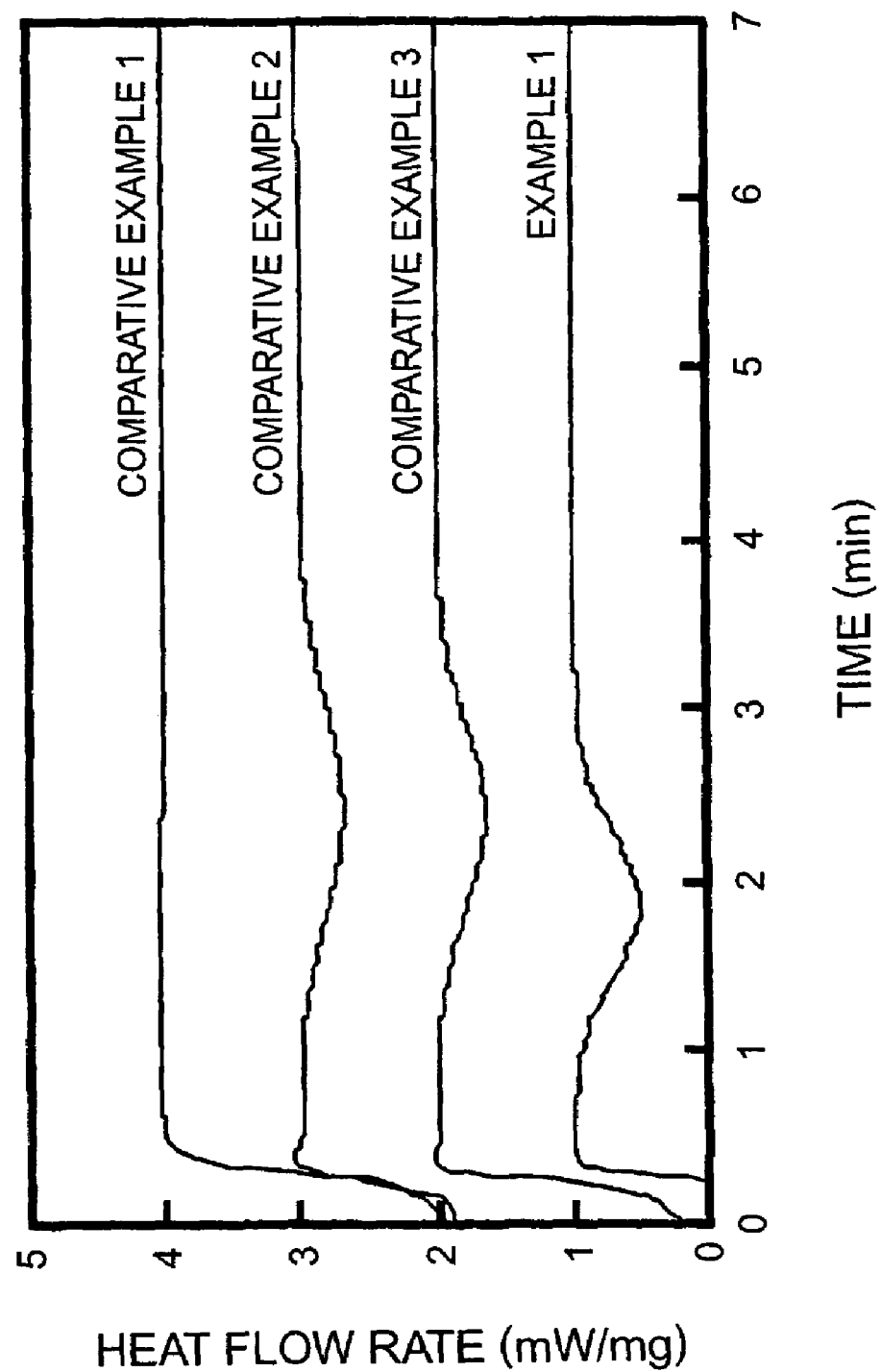

POLYLACTIC ACID COMPOSITE MATERIAL AND MOLDED BODY

BACKGROUND OF THE INVENTION

1. Field of the Invention

The present invention relates to a polylactic acid composite material and a molded body using the same.

2. Related Background Art

Polylactic acids show so-called biodegradability, i. e., the property of being broken down by the action of microorganisms and enzymes, and the decomposition products of polylactic acids are lactic acid, carbon dioxide and water, which are harmless to the human body. Accordingly, polylactic acids have attracted attention as medical materials and as substitutes for all-purpose resins.

Polylactic acids are crystalline resins; however, the crystallization rate of these resins is slow, and polylactic acids actually show behavior that is close to that of amorphous resins. Specifically, since such resins show abrupt and extreme softening (ordinarily, to an elastic modulus of less than $1/100$) in the vicinity of the glass transition temperature, it is difficult to obtain sufficient characteristics in terms of heat resistance, moldability, mold release properties, impact resistance and the like.

Accordingly, various methods for imparting the abovementioned characteristics have been proposed in order to ameliorate such problems. For example, a method in which moldability is imparted by adding higher fatty acid bis-amides to polylactic acids so that blocking is prevented is disclosed in Japanese Patent Application Laid-Open No. H6-299054, a method in which mold release properties and molding workability are imparted by adding fatty acid amides to a thermoplastic polymer composition consisting chiefly of a polylactic acid is disclosed in Japanese Patent Application Laid-Open No. H8-27363, and a method in which the degradation rate is controlled by adding aliphatic carboxy acid amides or the like to a polymer consisting chiefly of a polylactic acid is disclosed in Japanese Patent Application Laid-Open No. H8-183898.

Furthermore, a method in which a molded body that possesses both transparency and heat resistance (crystallinity) is obtained by adding a transparent nucleus agent such as an aliphatic carboxylic acid amide or the like to an aliphatic polyester such as a polylactic acid or the like is described in Japanese Patent Application Laid-Open No. H9-278991.

SUMMARY OF THE INVENTION

However, in the case of conventional methods in which fatty acid amides are added to polylactic acids as described in the abovementioned patents, although the addition of aliphatic carboxylic acid amides or the like is observed to have an effect in increasing the crystallization rate, this effect is still inadequate; accordingly, an annealing treatment must be performed following molding in order to obtain a molded body that has a sufficient degree of crystallization. Furthermore, since the degree of crystallization is low, the crystal solidification inside the mold is insufficient in the case of (for example) injection molding; as a result, sufficient mold release characteristics cannot be obtained, and drawbacks such as the tendency of the molded body to undergo deformation at the time of mold release are encountered.

The present invention was devised in light of the problems encountered in the abovementioned prior art; it is an object of the present invention to provide a polylactic acid composite material which has a sufficiently rapid crystallization rate and is superior in terms of heat resistance, moldability and mold release properties, and which is useful for suppressing deformation when an annealing treatment is performed.

As a result of diligent research performed in order to solve the abovementioned problems, the present inventors discovered that in cases where both a low molecular weight compound that has an amide group and a layered clay mineral that has been organically modified using an organic onium salt are added to a polylactic acid, the crystallization rate is greatly increased compared to a case in which only the abovementioned low molecular weight compound or layered clay mineral is added. This discovery led to the perfection of the polylactic acid composite material of the present invention, which is superior in terms of heat resistance, moldability and mold release properties.

Specifically, the polylactic acid composite material of the present invention contains a polylactic acid, a low molecular weight compound which has an amide group, and a layered clay mineral that has been organically modified using an organic onium salt.

In the present invention, it is desirable that the molecular weight of the low molecular weight compound that has an amide group be 1,000 or less. It is desirable that this low molecular weight compound be a hydroxyamide and/or bis-amide.

Furthermore, it is desirable that the organic onium salt have hydroxyl groups.

The polylactic acid composite material of the present invention preferably also contains talc.

Furthermore, the polylactic acid composite material of the present invention also preferably contains whiskers and/or an EPDM rubber.

Furthermore, the molded body of the present invention is obtained by molding the abovementioned polylactic acid composite material of the present invention.

BRIEF DESCRIPTION OF THE DRAWINGS

The FIGURE is a graph which shows the relationship between time and heat flow rate that was observed when the crystallization rate and heat of crystallization were measured in Embodiment 1 and Comparative Examples 1 through 3.

DESCRIPTION OF THE PREFERRED EMBODIMENTS

Preferred embodiments of the present invention will be described in detail below.

The polylactic acid of the present invention is a polymer which has repeating units expressed by the following general formula (1):

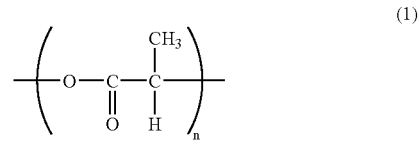

wherein n indicates an integer.

There are no particular restrictions on the average molecular weight of this polylactic acid; however, this molecular weight is preferably 10,000 or greater, more preferably 50,000 or greater, and even more preferably 100,000 or greater. If the average molecular weight of the polylactic acid is less than the abovementioned lower limit, the mechanical properties of the polymer such as the strength, elasticity and the like tend to be insufficient. Furthermore, from the standpoint of fluidity during molding, it is desirable that the average molecular weight of the polylactic acid be 400,000 or less.

There are no particular restrictions on the synthesis method of the polylactic acid; this synthesis may be direct polymerization of D-lactic acid or L-lactic acid, or ring-opening polymerization of D-lactide, L-lactide or meso-lactide, which are ring-form dimers of lactic acid. Furthermore, in cases where the polylactic acid is a copolymer of the D-lactic and L-lactic acid, the content ratio of either the D- or L-lactic acid is preferably 90 mol % or greater, more preferably 95 mol % or greater, even more preferably 98 mol % or greater, and most preferably 99 mol % or greater. If the contents of both the D- and L-lactic acids are less than 90 mol %, crystallization is impaired by a drop in steric regularity, so that the effect obtained by the present invention tends not to be sufficiently manifested.

The polylactic acid thus obtained shows optical isomerism; this polylactic acid may be poly-D-lactic acid, poly-L-lactic acid, or poly-DL-lactic acid. Furthermore, a polymer in which a polylactic acid whose main constituent component is D-lactic acid and a polylactic acid whose main constituent component is L-lactic acid are blended in arbitrary proportions may also be used.

Furthermore, in this polylactic acid of the present invention, other polymerizable monomers such as glycolide, caprolactone or the like may be further polymerized in addition to the lactic acid or lactides to form a copolymer. Furthermore, a polymer obtained by the homopolymerization of these other polymerizable monomer may be blended with a polylactic acid. Moreover, it is desirable that proportion of the polymer chains originating in these other polymerizable monomers relative to the total amount of the polymer be 50 mol % or less as calculated in terms of the monomers.

In the present invention, a low molecular weight compound that has an amide group and a layered clay mineral that has been organically modified by means of an organic onium salt are dispersed in the abovementioned polylactic acid. As a result, a synergistic effect in the production of polylactic acid crystal nuclei and the promotion of crystal growth is obtained, so that the crystallization rate of the polylactic acid can be sufficiently increased.

Examples of low molecular weight compounds having an amide group that can be used include aliphatic carboxylic acid amides such as aliphatic monocarboxylic acid amides, N-substituted aliphatic monocarboxylic acid amides, aliphatic bis-carboxylic acid amides, N-substituted aliphatic carboxylic acid bis-amides, N-substituted ureas and the like, aromatic carboxylic acid amides, hydroxyamides that also have hydroxyl groups and the like. These compounds may have a single amide group or two or more amide groups. Among these compounds, bis-amides are desirable in that such compounds make it possible to achieve a greater increase in the crystallization rate; furthermore, hydroxyamides are desirable in that such compounds are superior in terms of stability in polylactic acids, and make it possible to achieve a further increase in the heat resistance. Furthermore, bis-hydroxyamides are especially desirable in that such compounds make it possible to achieve simultaneously the respective effects that are obtained in cases where bis-amides and hydroxyamides are used.

Concrete examples of low molecular weight compounds having an amide group that can be used include lauric acid amide, palmitic acid amide, oleic acid amide, stearic acid amide, erucic acid amide, behenic acid amide, ricinolic acid amide, hydroxystearic acid amide, lactic acid amide, N-oleylpalmitic acid amide, N-oleyloleic acid amide, N-oleylstearic acid amide, N-stearyloleic acid amide, N-stearylstearic acid amide, N-stearylerucic acid amide, methylolstearic acid amide, methylolbehenic acid amide, methylene-bis-stearic acid amide, ethylene-bis-lauric acid amide, ethylene-bis-capric acid amide, ethylene-bis-oleic acid amide, ethylene-bis-stearic acid amide, ethylene-bis-erucic acid amide, ethylene-bis-behenic acid amide, ethylene-bis-isostearic acid amide, methylene-bis-12-hydroxystearic acid amide, hexamethylene-bis-12-hydroxystearic acid amide, ethylene-bis-12-hydroxystearic acid amide, butylene-bis-stearic acid amide, hexamethylene-bis-hydroxystearic acid amide, hexamethylene-bis-behenic acid amide, m-xylylene-bis-12-hydroxystearic acid amide, N,N'-dioleylsebacic acid amide, N,N'-dioleyladipic acid amide, N,N'-distearyladipic acid amide, N,N'-distearylsebacic acid amide, N,N'-distearylisophthalic acid amide, N,N'-distearylterephthalic acid amide, stearic acid monoethanolamide, stearic acid diethanolamide, oleic acid monoethanolamide, oleic acid diethanolamide, polyoxyethylenestearic acid amides, polyoxyethyleneoleic acid amides, N-butyl-N'-stearylurea, N-propyl-N'-stearylurea, N-stearyl-N'-stearylurea, N-phenyl-N'-stearylurea, xylene-bis-stearylurea, toluylene-bis-stearylurea, hexamethylene-bis-stearylurea, diphenylmethane-bis-stearylurea, diphenylmethane-bis-laurylurea and the like. Among these compounds, lactic acid amide, ethylene-bis-12-hydroxystearic acid amide, methylene-bis-12-hydroxystearic acid amide, hexamethylene-bis-12-hydroxystearic acid amide, m-xylylene-bis-12-hydroxystearic acid amide, methylolstearic acid amide, stearic acid monoethanolamide, stearic acid diethanolamide, oleic acid monoethanolamide, oleic acid diethanolamide, polyoxyethylenestearic acid amides and polyoxyethyleneoleic acid amides are especially desirable.

Furthermore, the molecular weight of the abovementioned low molecular weight compound having an amide group is preferably 1,000 or less, and is even more preferably 100 to 900. In cases where the molecular weight of this low molecular weight compound exceeds 1,000, the compatibility with polylactic acids decreases, so that the dispersibility drops, and so that bleed-out from the molded body tends to occur.

Furthermore, the melting point of the low molecular weight compound having an amide group is preferably 20 to 230° C. If the melting point of this low molecular weight compound is less than 20° C., there is a tendency for bleed-out to occur from the molded body, so that the external appearance of the molded body suffers. On the other hand, if the melting point exceeds 230° C., it becomes difficult to melt the compound under general molding conditions so that the moldability tends to drop.

Furthermore, in the polylactic acid composite material of the present invention, it is desirable that the content of the low molecular weight compound having an amide group be 0.01 to 20 parts by weight, preferably 0.1 to 10 parts by weight, per 100 parts by weight of the polylactic acid. If the content of the low molecular weight compound having an amide group is less than the abovementioned lower limit value, the degree to which the rigidity and crystallization rate are improved tends to be insufficient; on the other hand, in cases where the this content exceeds the abovementioned upper limit value, a plasticizing effect is manifested to an excessively strong degree, so that the rigidity may decrease.

Next, the layered clay mineral that is organically modified by means of an organic onium salt in the present invention will be described. A common layered clay mineral can be organically modified and used as the abovementioned layered clay mineral organically modified. Furthermore, such layered clay minerals that have been organically modified are commercially marketed; products that are commercially marketed by Southern Clay Products, Corp Chemical K.K. or the like may be used.

In concrete terms, smectite minerals such as montmorillonite, beidellite, saponite, hectorite and the like, kaolinite minerals such as kaolinite, hallosite and the like, vermiculite minerals such as vermiculite, trioctahedral vermiculite and the like, and mica minerals such as teniolite, tetrasilicic mica, muscovite, illite, sericite, phlogobite, biotite and the like may be cited as examples of common layered clay minerals. These layered clay minerals may be natural minerals, or synthetic minerals produced by hydrothermal synthesis, a melting process, a solid phase process or the like. Furthermore, in the present invention, the abovementioned layered clay minerals may be used singly, or may be used in combinations consisting of two or more minerals. Furthermore, it is desirable that the cation exchange capacity of the layered clay mineral be 30 to 300 meq/100 g.

In the present invention, the term "organic modification" refers to the adsorption and/or bonding of an organic substance between the layers and/or on the surface of the layered clay mineral by a physical or chemical method (preferably a chemical method). An organic onium salt is used for this organic modification. The abovementioned organic onium salt organically modifies the layered clay mineral and broadens the inter-layer distance of this mineral; as a result, the uniformity of the dispersion of the polylactic acid, low molecular weight compound having an amide group and layered clay mineral can be increased. Furthermore, in cases where the polylactic acid composite material of the present invention also contains talc, the uniformity of the dispersion of this talc is also increased.

In concrete terms, organic ammonium salts, organic phosphonium salts, organic pyridinium salts, organic sulfonium salts and the like may be cited as examples of such organic onium salts. For example, organic ammonium salts that can be used in the present invention are expressed by the formula $NR_4^+X^-$ (the four groups indicated by R may be the same or different, and respectively indicate hydrogen atoms, alkyl groups or aryl groups, and $X^-$ indicates a counter ion). Here, it is desirable that the number of carbon atoms of the organic onium salt (the total of the numbers of carbon atoms of the four groups indicated by R) be 6 or greater. If the number of carbon atoms of this organic onium salt is less than 6, the inter-layer distance of the layered clay mineral is not sufficiently broadened, so that it tends to become difficult to disperse the layered clay mineral uniformly in the polylactic acid. Furthermore, in cases where R indicates alkyl groups, these alkyl groups may have substituent groups, and hydroxyl groups are desirable as such substituent groups. Furthermore, halogen ions such as $Cl^-$, $Br^-$ and the like may be cited as examples of the counter ion expressed by $X^-$.

Ions expressed by the following general formula (2) or (3) may be cited as especially desirable examples of organic ammonium ions expressed by $NR_4^+$. A single type of such ions may be used alone, or both types of ions may be used in combination.

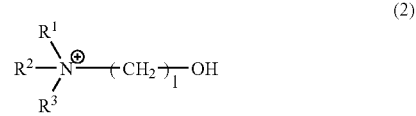

wherein $R^1$, $R^2$ and $R^3$ may be the same or different, and respectively indicate hydrogen atoms, alkyl groups or aryl groups, and l indicates an integer from 6 to 22.

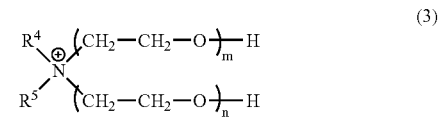

wherein $R^4$ and $R^5$ may be the same or different, and respectively indicate hydrogen atoms, alkyl groups or aryl groups, and the total number of carbon atoms of $R^4$ and $R^5$ is 6 or greater; furthermore, m and n may be the same or different, and indicate integers from 1 to 20.)

In the abovementioned general formula (2), $R^1$, $R^2$ and $R^3$ indicate hydrogen atoms, alkyl groups or aryl groups. In concrete terms, methyl groups, ethyl groups, n-propyl groups, i-propyl groups, n-butyl groups, sec-butyl groups, tert-butyl groups, linear or branched pentyl groups, linear or branched hexyl groups, linear or branched heptyl groups, linear or branched octyl groups, linear or branched nonyl groups, linear or branched decyl groups, linear or branched undecyl groups, linear or branched dodecyl groups, linear or branched tridecyl groups, linear or branched tetradecyl groups, linear or branched pentadecyl groups, linear or branched octadecyl groups and the like may be cited as examples of such alkyl groups. However, it is desirable that the number of carbon atoms of these alkyl groups be 1 to 4. If the number of carbon atoms of the alkyl groups exceeds the abovementioned upper limit value, the synthesis of the organic onium ion tends to become difficult. Furthermore, benzyl groups and the like may be cited as examples of aryl groups.

Furthermore, in the abovementioned general formula (2), l indicates the degree of polymerization of the methylene group ($-CH_2-$); this is an integer from 6 to 22, preferably 8 to 18. In cases where l is less than 6, the inter-layer distance of the layered clay mineral is not sufficiently broadened, so that the uniformity of the dispersion of the polylactic acid, low molecular weight compound having an amide group and layered clay mineral, and the uniformity of the dispersion of the talc, tend to drop. On the other hand, in cases where l exceeds 22, the synthesis of the organic onium salt tends to become difficult.

Furthermore, in the abovementioned general formula (3), $R^4$ and $R^5$ indicate hydrogen atoms, alkyl groups or aryl groups. The alkyl groups and aryl groups cited as examples in the description of $R^1$, $R^2$ and $R^3$ in general formula (2) may be cited as examples of such alkyl groups and aryl groups.

$R^4$ and $R^5$ in general formula (3) may be the same or different; however, it is desirable that the total number of carbon atoms of $R^4$ and $R^5$ be 6 or greater, preferably 8 or greater. If the total number of carbon atoms of $R^4$ and $R^5$ is less than 6, the inter-layer distance of the layered clay mineral cannot be sufficiently broadened, so that the uniformity of the dispersion of the polylactic acid, low molecular weight compound having an amide group and layered clay mineral, and the uniformity of the dispersion of the talc, tend to drop. For example, compounds in which $R^4$ is a hydrogen atom and $R^5$ is a dodecyl group, compounds in which $R^4$ is a methyl group and $R^5$ is an octadecyl group, and compounds in which $R^4$ and $R^5$ are octadecyl groups, are desirable for use as compounds that satisfy the abovementioned conditions.

Furthermore, in the abovementioned general formula (3), m and n indicate the degree of polymerization of the oxyethylene groups ($-CH_2CH_2O-$), and are integers from 1 to 20, preferably 1 to 10, more preferably 1 to 5, and most preferably 1. If m or n exceeds 20, the hydrophilicity of the layered clay mineral becomes excessively high, so that preparation of this mineral becomes difficult. Furthermore, m and n may be the same or different.

Furthermore, organic phosphonium salts in which the N (nitrogen atom) in the abovementioned general formula (2) or (3) is replaced by P (a phosphorus atom) may also be used in the present invention.

In the present invention, organic onium salts that have hydroxyl groups and organic onium salts that do not have hydroxyl groups may also be used in combination. In such cases, it is desirable that the mixture ratio of organic onium salts that have hydroxyl groups be 5 mol % or greater, preferably 10 mol % or greater, and even more preferably 15mol % or greater, relative to the total amount of organic onium salt. If the mixture ratio of organic onium salts that have hydroxyl groups is less than 5 mol %, the affinity with the polylactic acid or polymerizable monomers of the same (lactic acid, lactides) is insufficient, so that it becomes difficult for these salts to be stably held between the layers of the laminar compound.

Furthermore, it is desirable that the content of the organic onium salt be 10 to 150 parts by weight per 100 parts by weight of the layered clay mineral, and a content of 20 to 100 parts by weight is even more desirable. If the content of the organic onium salt is less than the abovementioned lower limit value, the inter-layer distance of the layered clay mineral cannot be sufficiently broadened, so that the uniformity of the dispersion of the polylactic acid, low molecular weight compound having an amide group and layered clay mineral, and the uniformity of the dispersion of the talc, tend to drop. On the other hand, in cases where this content exceeds the abovementioned upper limit value, the amount of organic onium salt that is introduced by physical adsorption is increased, so that the physical properties of the polylactic composite material tend to suffer (e. g., plasticization occurs).

Furthermore, in the polylactic acid composite material, it is desirable that the inter-layer distance of the layered clay mineral that is organically modified by means of an organic onium salt be 2.9 nm or greater using the mean distance between the centers of gravity of the respective layers as a standard, and an inter-layer distance of 10 nm or greater is even more desirable. If the inter-layer distance of the laminar compound is less than 2.9 nm, the uniformity of the dispersion of the polylactic acid, low molecular weight compound having an amide group and layered clay mineral drops, and the effect in promoting crystallization tends to drop.

Furthermore, in the polylactic acid composite material of the present invention, in regard to the content ratio of the polylactic acid and organically modified layered clay mineral, the amount of the latter is preferably 0.01 to 20 parts by weight, and more preferably 0.05 to 10 parts by weight, per 100 parts by weight of the former. If the content of the layered clay mineral is less than the abovementioned lower limit value, the degree of improvement in the rigidity and crystallization rate tends to be insufficient; on the other hand, if this content exceeds the abovementioned upper limit value, the polylactic acid becomes brittle, so that there is a danger of a conspicuous drop in the impact strength.

As was described above, the polylactic acid composite material of the present invention contains a polylactic acid, a low molecular weight compound which has an amide group, and a layered clay mineral that is organically modified by means of an organic onium salt. However, it is desirable that this composite material also contain talc in addition to these components.

Talc is a chemically stable mineral that is, superior in terms of heat resistance. There are no particular restrictions on the composition of such talc. However, in order to maximize dispersion in the polylactic acid composite material of the present invention, it is desirable that the mean particle size of this talc be small; in concrete terms, a particle size of 30 µm or less is desirable, a particle size of 15 µm or less is more desirable, and a particle diameter of 7.0 µm is especially desirable. Furthermore, such talc may be subjected to a surface treatment in order to improve adhesion to the resin. Such talc is commercially marketed; talc preparations of this type are marketed by Nippon Talc, Fuji Talc Kogyo and others.

In the polylactic acid composite material of the present invention, the talc content is preferably 0.1 to 40 wt %, more preferably 0.1 to 30 wt %, even more preferably 0.1 to 20 wt %, and most preferably 0.5 to 20 wt %. If the abovementioned talc content is less than the abovementioned lower limit value, the degree of improvement in the crystallization rate tends to be insufficient; on the other hand, in cases where this content exceeds the abovementioned upper limit value, the polylactic acid becomes brittle, so that the impact strength tends to drop conspicuously.

In addition to the abovementioned composition, it is desirable that the polylactic acid composite material of the present invention also contain whiskers and/or and EPDM rubber. As a result of the addition of whiskers, the polylactic acid composite material of the present invention tends to show a further improvement in heat resistance; furthermore, as a result of the addition of an EPDM rubber, which is a soft rubber, the polylactic acid composite material of the present invention tends to show a further improvement in impact resistance while maintaining a sufficient heat resistance.

The whiskers used in the present invention are a fiber-form inorganic filler. For example, whiskers consisting of wollastonite, sepiolite, asbestos, zonolite, ellestadite, aluminum borate, calcium carbonate, silicon carbonate, silicon nitride, potassium titanate, basic magnesium sulfate, zinc oxide, graphite, magnesia, calcium sulfate, magnesium borate, magnesium oxide, titanium diboride, α-alumina or chrysotile may be cited as examples of such whiskers. Among these, whiskers consisting of wollastonite or potassium titanate are especially suitable for use.

Furthermore, it is desirable that whiskers with an aspect ratio (length of fibers/diameter of fibers) of 5 to 200, preferably 5 to 100, be used as such whiskers. If the aspect ratio is less than 5, the reinforcing effects tends to be insufficient; on the other hand, if the aspect ratio exceeds 200, the dispersibility drops so that the strength tends to be insufficient. Furthermore, it is desirable that the whiskers used in the present invention be a needle-form single-crystal substance, and it is even more desirable that this substance be a single crystal with a cross-sectional area of $8 \times 10^{-5}$ in$^2$ or less, and a length that is 10 times the mean diameter of the cross section or greater. Such whiskers are commercially marketed, and products marketed by Kansai Matec, Otsuka Kagaku and others are available.

In the polylactic acid composite material of the present invention, it is desirable that the whisker content be 0.1 to 40 wt %; a whisker content of 0.1 to 30 wt % is more desirable, a whisker content of 1 to 30 wt % is even more desirable, and a whisker content of 5 to 30 wt % is most desirable. If the abovementioned whisker content is less than the abovementioned lower limit value, it tends to be difficult to obtain an additional effect in improving the heat resistance; on the other hand, if this content exceeds the abovementioned upper limit value, the polylactic acid becomes brittle, so that the impact strength tends to drop conspicuously.

Next, the EPDM rubber used in the present invention will be described. It is sufficient if this EPDM resin contains EPDM (Ethylene Propylene Diene Terpolymer) as a rubber component; it is desirable that the EPDM component be contained in the EPDM resin at the rate of 50 wt % to 95 wt %. If the abovementioned EPDM component is less than 50 wt %, it becomes difficult to obtain an effect in improving the impact resistance; on the other hand, if this component exceeds 95 wt %, the compatibility with the polylactic acid is poor, and the polylactic acid composite material tends to become brittle. Furthermore, it is desirable that a plurality of other components be blended and/or copolymerized in order to improve the compatibility with the polylactic acid; in particular, it is even more desirable that an acrylic component that has a high compatibility with the polylactic acid be contained in the EPDM resin at the rate of 5 wt % to 20 wt %.

In the polylactic acid composite material of the present invention, it is desirable that the content of the EPDM resin be 1 to 80 wt %; a content of 1 to 70 wt % is more desirable, a content of 5 to 60 wt % is even more desirable, and a content of 10 to 50 wt % is most desirable. If the content of the abovementioned EPDM resin is less than the abovementioned lower limit value, it tends to become difficult to obtain an effect in improving the impact strength; on the other hand, if this content exceeds the abovementioned upper limit value, the heat resistance tends to drop conspicuously.

Furthermore, in the polylactic acid composite material of the present invention, plasticizers, pigments, stabilizers, anti-static agents, ultraviolet absorbing agents, anti-oxidants, flame retarding agents, mold release agents, lubricants, dyes, antimicrobial agents, terminal closing agents and the like may also be added as other additives as long as this has no deleterious effects on the characteristics of the composite material.

Next, methods used to manufacture the polylactic acid composite material of the present invention will be described.

The first manufacturing method of the present invention comprises an organic modification step in which a layered clay mineral is organically modified by means of an organic onium salt, and a melting and kneading step in which the layered clay mineral obtained in the organic modification step, a polylactic acid and a low-molecular-molecular weight compound having an amide group are melted and kneaded. As a result, the polylactic acid, low-molecular-molecular weight compound having an amide group and layered clay mineral organically modified by means of an organic onium salt are thoroughly and uniformly mixed; accordingly, the polylactic acid composite material of the present invention, which is superior in terms of heat resistance, moldability and mold release properties, can be easily and reliably obtained.

Furthermore, in the melting and kneading step, it would also be possible to use a commercially marketed layered clay mineral instead of the [abovementioned] layered clay mineral obtained in the organic modification step. In this case, the organic modification step is unnecessary. Furthermore, in cases where the polylactic acid composite material of the present invention contains talc, this talc may also be added in the melting and kneading step. Furthermore, whiskers and/or an EPDM rubber may also be added in the melting and kneading step in order to achieve a further improvement in the heat resistance and impact resistance.

For example, the organic modification step may be performed using the method disclosed by the present applicant in Japanese Patent No. 2627194. Specifically, the organic modification of the layered clay mineral can be accomplished by ion exchange of the inorganic ions in the layered clay mineral with organic onium ions generated from the organic onium salt (e.g., organic ammonium ions in an organic ammonium salt).

More concretely, in cases where (for example) an organic ammonium salt is used, organic modification can be accomplished by the following method. Specifically, in cases where a bulk layered clay mineral is used, this mineral is first pulverized to a powder by means of a ball mill or the like. Next, this powder is dispersed in water using a mixer or the like so that an aqueous dispersion of the layered clay mineral is obtained. Separately from this, an organic amine which has hydroxyl groups and an acid such as hydrochloric acid or the like is added to water, and an aqueous solution of an organic ammonium salt having hydroxyl groups is prepared. This aqueous solution is added to the aqueous dispersion of the abovementioned layered clay mineral and mixed, so that inorganic ions in the layered clay mineral are replaced by organic ammonium ions generated from the organic ammonium salt. An organically modified layered clay mineral can be obtained by removing the water from this mixture.

Besides water, it is possible to use methanol, ethanol, propanol, isopropanol, ethylene glycol and mixtures of these solvents, as well as mixtures of these solvents with water, as the dispersing medium of the organic ammonium salt and layered clay mineral.

Next, in the melting and kneading step, the layered clay mineral obtained in the organic modification step, the polylactic acid and the low-molecular-weight compound having an amide group, as well as talc or the like if necessary, are melted and kneaded, thus producing the polylactic acid composite material of the present invention.

There are no particular restrictions on the temperature used in the melting and kneading step; preferably, however, this temperature is 150 to 250° C. If this temperature is lower than the abovementioned lower limit value, the melting of the polylactic acid is insufficient, so that it becomes difficult to achieve uniform dispersion of the low-molecular-weight compound having an amide group and the organically modified layered clay mineral, and uniform dispersion of the talc, in the polylactic acid. On the other hand, if this temperature exceeds the abovementioned upper limit value, the molecular weight of the polylactic acid drops so that the physical properties of the polylactic acid composite material tend to suffer (e.g., embrittlement occurs).

Furthermore, it is desirable that the kneading step be performed according to the method disclosed by the present applicant in International Publication No. WO 99/50340. Specifically, the uniformity of the dispersion of the organically modified layered clay mineral, the polylactic acid and the low-molecular-weight compound having an amide group can be sufficiently increased by melting and kneading these components at a mean resin calculated pressure of $5\times10^4$ Pa or greater, a maximum pressure value of $1\times10^5$ Pa, a total shear of $10^5$ to $10^7$, and a shear energy of $10^{10}$ to $10^{14}$ Pa using a two-shaft kneader equipped with a screw that can apply a high resin calculated pressure, a high total shear and a high shear energy.

In the polylactic acid composite material thus obtained, the uniformity of the dispersion of the polylactic acid, low-molecular-weight compound having an amide group and organically modified layered clay mineral is sufficiently high. However, if a salt that has hydroxyl groups is used as the organic onium salt, these hydroxyl groups will react with the terminal carboxyl groups of the polylactic acid in the melting and kneading step, so that the polylactic acid is held more stably between the layers of the layered clay mineral. Accordingly, the heat resistance, moldability and mold release properties can be further improved.

Furthermore, the second manufacturing method of the present invention is a method comprising an organic modification step in which a layered clay mineral is organically modified by means of an organic onium salt, and a polymerization step in which at least one polymerizable monomer selected from a set comprising L-lactic acid, D-lactic acid, L-lactide, D-lactide and meso-lactide is mixed with a low-molecular-weight compound having an amide group, and this polymerizable monomer is polymerized to produce a polylactic acid. As a result, the low-molecular-weight compound having an amide group and the layered clay mineral organically modified by an organic onium salt are dispersed with sufficient uniformity in the polylactic acid that is obtained, so that the polylactic acid composite material of the present invention, which is superior in terms of heat resistance, moldability and mold release properties, can be easily and reliably obtained.

Furthermore, in the polymerization step, a commercially marketed layered clay mineral can be used instead of the layered clay mineral obtained in the organic modification step; in this case, the organic modification step is unnecessary. Furthermore, in cases where the polylactic acid composite material of the present invention contains talc, this talc may also be added in the polymerization step. Furthermore, whiskers and/or an EPDM rubber may also be added in the polymerization step in order to achieve a further improvement in the heat resistance and impact resistance.

The organic modification step of the second manufacturing method can be performed in the same manner as the organic modification step of the abovementioned first manufacturing method.

Next, in the polymerization step, the layered clay mineral obtained in the organic modification step and at least one polymerizable monomer selected from a set comprising L-lactic acid, D-lactic acid, L-lactide and D-lactide, as well as talc or the like if necessary, are mixed, and the polymerizable monomer is polymerized to produce a polylactic acid. Here, in cases where L-lactic acid and/or D-lactic acid are used, a polylactic acid is produced by direct polycondensation of these compounds; on the other hand, in cases where L-lactide and/or D-lactide are use, a polylactic acid is produced by the ring-opening polymerization of these compounds.

The polymerization step may be performed using a specified catalyst, or without a catalyst. In concrete terms, tin octylate, tin chloride, zinc chloride, lead oxide, lead carbonate, titanium chloride, alkoxytitanium, germanium oxide, zirconium oxide and the like may be cited as examples of catalysts. It is desirable that the amount of catalyst used be 0.001 to 1 part by weight per 100 parts by weight of the polymerizable monomer. Furthermore, it is desirable that the reaction temperature in the polymerization step be 100 to 200° C.

Furthermore, the polymerization of the polymerizable monomer is ordinarily initiated with the hydroxyl groups contained in the system as the reaction points. However, in cases where the organic onium salt has hydroxyl groups, the polymerization of the polymerizable monomer is initiated with these hydroxyl groups as reaction points in the polymerization step; accordingly, the heat resistance, moldability and mold release properties can be further enhanced.

Next, the molded body of the present invention will be described.

As was described above, the molded body of the present invention is obtained using the polylactic acid composite material of the present invention. There are no particular restrictions on the shape, thickness or the like of the molded body of the present invention; this molded body may be an injection-molded article, extrusion-molded article, compression-molded article, blow-molded article, sheet, film, yarn, fabric or the like. In more concrete terms, automotive parts such as bumpers, radiator grilles, side moles, garnishes, wheel covers, aero parts, instrument panels, door trim, seat fabrics, door handles, floor mats and the like, housings of household electrical products, product packaging films, waterproof sheets, various types of containers, bottles and the like may be cited as examples. Furthermore, in cases where the molded body of the present invention is used as a sheet, this sheet may be laminated with paper or other polymer sheets, and used as a laminated body with a multi-layer structure.

Furthermore, when the molded body of the present invention is manufactured, there are no particular restrictions on the molding method used; the molded body of the present invention can be suitably used in injection molding, extrusion molding, blow molding, inflation molding, contour extrusion molding, injection blow molding, vacuum pressure hollow molding, spinning or the like. Furthermore, in the case of methods in which the mold is filled with a melt of the resin material during molding, and the resin is crystallized "as is" inside the mold (in-mold crystallization process), the productivity and operating characteristics are poor in the case of conventional resins, and there are instances in which the crystallization is insufficient so that the desired molded body cannot be obtained. However, the manufacture of molded bodies can be accomplished efficiently and reliably by using the polylactic acid composite material of the present invention.

EXAMPLES

The present invention will be described more concretely below in terms of examples and comparative examples. However, the present invention is not limited in any way by the examples described below.

Example 1

(Organic Modification of Layered Clay Mineral)
100 g of sodium type montmorillonite (Kunipia F manufactured by Kunimine Kogyo, cation exchange capacity: 115 meq/100 g) was dispersed in 5,000 ml of water at 80° C. Meanwhile, 59.2 g of dihydroxyethylmethylstearylammonium bromide was dissolved in 2000 ml of water at 80° C., and the montmorillonite was organically modified by mixing the two preparations. The organically modified montmorillonite thus obtained (hereafter referred to as C18 (OH)$_2$—Mt) was washed three times with water at 80° C., and was then freeze-dried and pulverized. The residual amount of the inorganic component of the C18(OH)$_2$—Mt determined by burning it at about 1000° C. was 63%.

(Kneading of Layered Clay Mineral, Polylactic Acid and Low Molecular Weight Compound Having an Amide Group)

Using a twin screw extruder (TEX30α manufactured by Nippon Seikojo), a mixture prepared by adding 3 wt % (calculated as inorganic content) C18(OH)$_2$—Mt and 1 wt % ethylene-bis-12-hydroxystearic acid amide to a polylactic acid resin (#5400 manufactured by K.K. Toyota jidosha) was melted and kneaded at a screw rotation speed of 300 rpm, a resin temperature of 200° C., and a resin feed rate of 5 kg/h, thus producing the desired resin composite material. The resin composite material thus obtained was extruded into the form of a strand, quickly cooled with water, and formed into pellets using a strand cutter.

(Evaluation of Temperature Dependence of Elastic Modulus)

Square columnar test pieces (80 mm×10 mm×4 mm) were injection-molded using injection molding machines (PS40E2ASE and FS75 manufactured by Nissei Jushi Kogyo K.K.) under two different sets of conditions, i.e., with the mold temperature and cooling time set at 40° C. and 60 s (molding conditions 1) and with the mold temperature and cooling time set at 100° C. and 120 s (molding conditions 2). A sample piece (40 mm×4 mm×2 mm) was cut from the central portion of each of these test pieces, and the temperature dependence of the storage modulus was measured using a dynamic viscoelasticity measuring device (DVA-200 manufactured by IT Keisoku K.K.). The temperature range used in this measurement was 0 to 150° C., the temperature elevation rate was 4° C./min, and the frequency was set at 10 Hz. Measurements were performed in the tensile mode. Furthermore, the data recording interval was 2° C.

The temperature $T_1$ at which the storage modulus (E') showed a minimum vale at the glass transition temperature ($T_g$) or higher, the temperature $T_2$ at which E' showed a maximum value at $T_g$ or higher, and the minimum temperature $T_3$ at which E' was 0.5 GPa or less, were determined from the measurement data obtained. The results are shown in Table 1. Furthermore, in the case of molding conditions 2, E' decreased monotonically with the temperature; accordingly, measurement values for $T_1$ and $T_2$ could not be obtained.

(Evaluation of Injection Moldability)

Furthermore, in the evaluation of the temperature dependence of the elastic modulus, the moldability and mold release characteristics were evaluated according to the following criteria for the sample piece manufactured at a mold temperature of 100° C. and a cooling time of 120 s:

A: Moldability and mold release characteristics good. The solidification by crystallization of the sample piece was sufficient, and a sample piece with no warping or shrinkage porosity could be removed.

B: Moldability and mold release characteristics poor. The solidification by crystallization of the sample piece was insufficient, and phenomena such as the presence of warping and shrinkage porosity, considerable deformation of the sample piece due to adhesion to the mold during molding, roughening of the surface and the like were observed.

C: Moldability and mold release characteristics extremely poor. The sample piece remained in a softened state, and it was difficult to take off a sample piece that maintained its shape.

(Evaluation of Heat Distortion Temperature)

Among the abovementioned sample pieces, the sample pieces obtained at a mold temperature of 100° C. and a cooling time of 120 s were used. The heat distortion temperature was evaluated under two sets of conditions, i.e., a load of 1.80 MPa and a load of 0.45 MPa, according to JIS K7191 (flat-wise method). The results obtained are shown in Table 1.

(Evaluation of Dispersibility)

The abovementioned pellets were cut with a microtome to produce ultra-thin cut pieces. The conditions of dispersion of the clay layers were observed in these cut pieces using a transmission electron microscope (Joel-200CX manufactured by Nippon Denshi), and the dispersibility was evaluated according to the following criteria:

A: Dispersed state extremely good. The clay layers were finely-dispersed more or less layer by layer.

B: Dispersed state good. 50% or more of the clay layers were aggregated, but the inter-layer distance was 2.9 nm or greater.

C: Dispersed state poor. For the most part, several tens of layer or more were in an aggregated stage, and the inter-layer distance was less than 2.9 nm.

The results obtained are shown in Table 1.

(Measurement of Crystallization Rate and Heat of Crystallization by DSC)

Using the abovementioned pellets, a sheet with a thickness of approximately 0.5 mm was manufactured by hot-pressing at 180° C. A sample of 5 to 10 mg was collected from this sheet and clamped in an aluminum pan, and the crystallization rate and heat of crystallization accompanying crystallization were measured using a differential thermal analyzer (DSC7 manufactured by Perkin-Elmer Co.). Furthermore, these measurements were performed in the isothermal crystallization mode. Specifically, when the sample is rapidly cooled to a certain temperature (100° C. in the case of the present example) from a molten state, and is maintained at this temperature, a exothermic peak that accompanies crystallization appears. The crystallization rate was determined from the time at which the peak appeared after the sample was maintained at a constant temperature, and the heat of crystallization accompanying crystallization was determined from the peak area. Furthermore, the measurements were performed in a nitrogen atmosphere, and the temperature was varied in the order of the following four steps (step 4 corresponds to the actual isothermal crystallization measurement):

Step 1: temperature elevated from 30° C. to 200° C. at a temperature elevation rate of 50° C./min Step 2: temperature maintained at 200° C. for 5 minutes Step 3: temperature lowered from 200° C. to 100° C. at a temperature lowering rate of 100° C./min Step 4: temperature maintained at a constant value of 100° C. until crystallization is completed (maximum of 30 minutes)

The correlation between time and heat of crystallization in the abovementioned measurements is shown in the FIGURE, and the measurement values obtained are shown in Table 1. Furthermore, in the FIGURE, the amount of decrease in the heat flow rate corresponds to the heat of crystallization that accompanies crystallization. Furthermore, this means that in Table 1, the crystallization rate is higher as the heat of crystallization accompanying crystallization is greater.

Example 2

An organically modified layered clay mineral (R(OH)$_2$—Mt) was obtained in the same manner as in Example 1, except that dihydroxyethylmethylalkylammonium bromide (in which the alkyl groups were a mixture of beef tallow compositions (tetradecyl/hexadecyl/octadecyl=5:30:65) was used instead of the dihydroxyethylmethylstearylammonium bromide.

Next, a polylactic acid composite material was prepared in the same manner as in Example 1, except that R(OH)$_2$—Mt was used instead of C18(OH)$_2$—Mt, and hexamethylene-bis-12-hydroxystearic acid amide was used instead of ethylene-bis-12-hydroxystearic acid amide; then, the injection moldability, heat distortion temperature and dispersibility were evaluated, and the crystallization rate and heat of crystallization were measured. The results obtained are shown in Table 1. Furthermore, in the case of molding conditions 2 in the evaluation of the injection moldability, E' decreased monotonically with the temperature; accordingly, measurement values for $T_1$ and $T_2$ could not be obtained.

Example 3

An organically modified layered clay mineral (C12-Mt) was obtained in the same manner as in Example 1, except that dodecylammonium bromide was used instead of dihydroxyethylmethylstearylammonium bromide.

Next, a polylactic acid composite material was prepared in the same manner as in Example 1, except that C12-Mt was used instead of C18(OH)$_2$—Mt; then, the injection moldability, heat distortion temperature and dispersibility were evaluated, and the crystallization rate and heat of crystallization were measured. The results obtained are shown in Table 1. Furthermore, in the case of molding conditions 2 in the evaluation of the injection moldability, E' decreased monotonically with the temperature; accordingly, measurement values for $T_1$ and $T_2$ could not be obtained.

Example 4

An organically modified layered clay mineral (C12-Mica) was obtained in the same manner as in Example 3, except that expansive mica was used instead of montmorillonite.

Next, a polylactic acid composite material was prepared in the same manner as in Example 3, except that C12-Mica was used instead of C12-Mt; then, the injection moldability, heat distortion temperature and dispersibility were evaluated, and the crystallization rate and heat of crystallization were measured. The results obtained are shown in Table 1. Furthermore, in the case of molding conditions 2 in the evaluation of the injection moldability, E' decreased monotonically with the temperature; accordingly, measurement values for $T_1$ and $T_2$ could not be obtained.

Example 5

An organically modified layered clay mineral (C18-Mt) was obtained in the same manner as in Example 1, except that stearylammonium chloride was used instead of dihydroxyethylmethylstearylammonium chloride.

Next, a polylactic acid composite material was prepared in the same manner as in Example 1, except that C18-Mt was used instead of C18(OH)$_2$—Mt; then, the injection moldability, heat distortion temperature and dispersibility were evaluated, and the crystallization rate and heat of crystallization were measured. The results obtained are shown in Table 1. Furthermore, in the case of molding conditions 2 in the evaluation of the injection moldability, E' decreased monotonically with the temperature; accordingly, measurement values for $T_1$ and $T_2$ could not be obtained.

Comparative Example 1

A polylactic acid was used "as is" without kneading a low molecular weight compound having an amide group or an organically modified layered clay mineral; the injection moldability, heat distortion temperature and dispersibility were evaluated, and the crystallization rate and heat of crystallization were measured, [in the same manner as described above]. The results obtained are shown in Table 1. Furthermore, the correlation between time and heat flow rate in the measurement of the crystallization rate and heat of crystallization is shown in the FIGURE. Moreover, under the molding conditions 2 in the evaluation of the injection moldability, and in the evaluation of the heat distortion temperature, sample pieces could not be prepared; accordingly, measurement values could not be obtained. Furthermore, in the measurement of the crystallization rate and heat of crystallization, a crystallization peak could not be observed within the measurement range; accordingly, measurement values could not be obtained. Furthermore, for convenience, the data for Comparative Example 1 in the FIGURE is shown with the base line shifted upward (the same is also true of Comparative Examples 2 and 3).

Comparative Example 2

A polylactic acid composite material was prepared in the same manner as in Example 1, except that only C18(OH)$_2$—Mt was added to the polylactic acid; then, the injection moldability, heat distortion temperature and dispersibility were evaluated, and the crystallization rate and heat of crystallization were measured. The results obtained are shown in Table 1. Furthermore, the correlation between time and heat flow rate in the measurement of the crystallization rate and heat of crystallization is shown in the FIGURE.

Comparative Example 3

A polylactic acid composite material was prepared in the same manner as in Example 1, except that only ethylene-bis-12-hydroxystearic acid amide was added to the polylactic acid; then, the injection moldability, heat distortion temperature and dispersibility were evaluated, and the crystallization rate and heat of crystallization were measured. The results obtained are shown in Table 1. Furthermore, the correlation between time and heat flow rate in the measurement of the crystallization rate and heat of crystallization is shown in the FIGURE. Furthermore, in the measurement of the crystallization rate and heat of crystallization, a crystallization peak could not be observed within the measurement range; accordingly, measurement values could not be obtained.

Comparative Example 4

A polylactic acid composite material was prepared in the same manner as in Example 1, except that sodium type montmorillonite was used "as is" without being organically modified. Then, the injection moldability, heat distortion temperature and dispersibility were evaluated, and the crystallization rate and heat of crystallization were measured. The results obtained are shown in Table 1.

TABLE 1

|  |  |  | EXAMPLE 1 | EXAMPLE 2 | EXAMPLE 3 | EXAMPLE 4 | EXAMPLE 5 | COMPARATIVE EXAMPLE 1 | COMPARATIVE EXAMPLE 2 | COMPARATIVE EXAMPLE 3 | COMPARATIVE EXAMPLE 4 |
|---|---|---|---|---|---|---|---|---|---|---|---|
| INJECTION MOLDABILITY | MOLDING CONDITIONS 1 | $T_1$ [° C.] | 74 | 78 | 78 | 76 | 78 | 90 | 80 | 76 | 88 |
|  |  | $T_2$ [° C.] | 88 | 90 | 94 | 92 | 94 | 104 | 96 | 98 | 102 |
|  |  | $T_3$ [° C.] | 64 | 62 | 62 | 66 | 64 | 64 | 62 | 58 | 64 |
|  | MOLDING CONDITIONS 2 | $T_1$ [° C.] | — | — | — | — | — | — | 90 | — | — |
|  |  | $T_2$ [° C.] | — | — | — | — | — | — | 76 | — | — |
|  |  | $T_3$ [° C.] | 114 | 110 | 116 | 116 | 112 | — | 72 | — | — |
|  |  | MOLDABILITY, MOLD RELEASE CHARACTERISTICS | A | A | A | A | A | C | B | C | C |
| HEAT DISTORTION TEMPERATURE (° C.) | 1.80 MPa |  | 80.7 | 78.6 | 77.5 | 80.1 | 79.2 | — | 60.0 | — | — |
|  | 0.45 MPa |  | 135.0 | 126.5 | 118.5 | 127.8 | 119.3 | — | 68.7 | — | — |
| DISPERSIBILITY |  |  | A | A | B | B | B | — | A | — | — |
| DSC | CRYSTALLIZATION RATE [min] |  | 1.87 | 1.85 | 1.92 | 1.89 | 1.95 | — | 2.43 | 2.40 | 2.68 |
|  | HEAT OF CRYSTALLIZATION [J/g] |  | 29.0 | 31.0 | 28.8 | 30.3 | 28.5 | — | 25.3 | 25.8 | 24.8 |

In the polylactic acid composite materials of Examples 1 through 5, as is shown in Table 1, an organically modified layered clay mineral was dispersed in the polylactic acid with sufficient uniformity. Furthermore, these polylactic acid composite materials showed a rapid crystallization rate, superior moldability and mold release properties when crystallized inside the mold, and a high heat distortion temperature. Furthermore, it was also confirmed from the results of DSC that these polylactic acid composite materials had a rapid crystallization rate, and that crystallization proceeded to a sufficient degree.

Example 6

(Kneading of Polylactic Acid, Low Molecular Weight Compound Having an Amide Group, Layered Clay Mineral and Talc)

Using a twin screw extruder (TEX30α manufactured by Nippon Seikojo), a mixture prepared by adding ethylene-bis-12-hydroxystearic acid amide, an organically modified layered clay mineral (Cloisite 30B, manufactured by Southern Clay Products) and talc (Micro Ace P-6, mean particle size: 4.0 μm, manufactured by Nippon Talc) to a polylactic acid prepared and dried beforehand (# 5400 manufactured by Toyota Jidousya) so that the respective amounts added were 1 wt % in the polylactic acid composite material, was melted and kneaded at a screw rotation speed of 300 rpm, a resin temperature of 200° C. and a resin feed rate of 5 kg/h, thus producing the desired resin composite material. The resin composite material thus obtained was extruded into the form of a strand and rapidly cooled with water, and this resin was cut with a strand cutter to form pellets. These pellets were dried to an absolutely dry state; afterward, square columnar test pieces (80 mm×10 mm×4 mm) were injection-molded with the mold temperature and cooling time varied according to three sets of conditions, i.e., (i) 40° C., 60 seconds, (ii) 80° C., 120 seconds and (iii) 100° C., 120 seconds, using injection molding machines (PS40E2ASE and FS75 manufactured by Nissei Jushi Kogyo K.K.). The degree of deformation during annealing and the moldability of the test pieces obtained under the respective molding conditions were evaluated according to the following criteria. Furthermore, in the case of the molding conditions (iii) of 100° C., 120 seconds, the heat distortion temperature was also measured.

(Evaluation of Injection Moldability)

(i) Evaluation under Molding Conditions of 40° C., 60 Seconds

In the case of these conditions, almost no crystallization occurred inside the mold; accordingly, amorphous test pieces were molded. The degree of deformation of the test pieces was evaluated by subjecting these test pieces to an annealing treatment (2 hours at 120° C. in a vacuum), and thus causing crystallization.

A: almost no deformation seen (degree of deformation less than 1.0%)

B: slight deformation seen (degree of deformation 1.0% to 10%)

C: considerable deformation seen (degree of deformation exceeding 10%)

(ii) Evaluation under Molding Conditions of 80° C., 120 Seconds

The moldability when the test pieces were removed from the mold was evaluated. The progression of crystallization inside the mold is reflected by the elastic modulus at 80° C.

A: molding possible with almost no deformation (degree of deformation less than 1.0%)

B: molding could be removed from the mold, but evaluation of physical tests difficult due to slight deformation C: removal from mold difficult; molding impossible (iii) Evaluation under Molding Conditions of 100° C., 120 Seconds The moldability when the test pieces were removed from the mold was evaluated. The progression of crystallization inside the mold is reflected by the elastic modulus at 100° C.

A: molding possible with almost no deformation (degree of deformation less than 1.0%)

B: molding could be removed from the mold, but evaluation of physical tests difficult due to slight deformation C: removal from mold difficult; molding impossible In the case of these molding conditions, the heat distortion temperature (° C. at 1.80 Mpa) was measured, and the heat resistance was evaluated. Furthermore, the measurement method used conformed to the method (flat-wise method) stipulated in JIS K7191. The results obtained are shown in Table 2.

Example 7

Polylactic acid pellets were obtained in the same manner as in Example 6, except that SG-95 (mean particle size 2.5 μm, manufactured by Nippon Talc) was used as the talc instead of Micro Ace P-6. Then, square columnar test pieces were molded in the same manner as in Example 6 using the polylactic acid pellets thus obtained. The degree of deformation during the annealing treatment and the moldability were evaluated in the same manner as in Example 6, and the heat distortion temperature was also measured. The results obtained are shown in Table 2.

Example 8

Polylactic acid pellets were obtained in the same manner as in Example 1, except that hexamethylene-bis-12-hydroxystearic acid amide was used instead of ethylene-bis-12-hydroxystearic acid amid. Then, square columnar test pieces were molded in the same manner as in Example 6 using the polylactic acid pellets thus obtained. The degree of deformation during the annealing treatment and the moldability were evaluated in the same manner as in Example 6, and the heat distortion temperature was also measured. The results obtained are shown in Table 2.

Example 9

Polylactic acid pellets were obtained in the same manner as in Example 6, except that C12-Mt was used as the organically modified layered clay mineral instead of Cloisite 30B. Then, square columnar test pieces were molded in the same manner as in Example 6 using the polylactic acid pellets thus obtained. The degree of deformation during the annealing treatment and the moldability were evaluated in the same manner as in Example 6, and the heat distortion temperature was also measured. The results obtained are shown in Table 2.

Furthermore, the C12-Mt was obtained by the following method. Specifically, 100 g of sodium type montmorillonite (Kunipia F manufactured by Kunimine Kogyo, cation exchange capacity: 115 meq/100 g) was dispersed in 5,000 ml of water at 80° C. Meanwhile, 59.2 g of dodecylammonium bromide was dissolved in 2000 ml of water at 80° C., and the montmorillonite was organically modified by mixing the two preparations. The organically modified montmorillonite thus obtained was washed three times with water at 80° C., and was then freeze-dried and pulverized to produce the organically modified layered clay mineral C12-Mt.

Comparative Example 5

Polylactic acid pellets were obtained in the same manner as in Example 6, except that the polylactic acid (# 5400 manufactured by Toyota Jidousya) was used "as is" without adding a low molecular weight compound having an amide group, an organically modified layered clay mineral or talc, and without being kneaded. Then, square columnar test pieces were molded in the same manner as in Example 6 using the polylactic acid pellets thus obtained. The degree of deformation during the annealing treatment and the moldability were evaluated in the same manner as in Example 6, and the heat distortion temperature was also measured. The results obtained are shown in Table 2. Furthermore, in the evaluation of the heat distortion temperature, test pieces could not be prepared; accordingly, measurement values could not be obtained.

Comparative Example 6

Polylactic acid pellets were obtained in the same manner as in Example 6, except that an organically modified layered clay mineral was not added. Then, square columnar test pieces were molded in the same manner as in Example 6 using the polylactic acid pellets thus obtained. The degree of deformation during the annealing treatment and the moldability were evaluated in the same manner as in Example 6, and the heat distortion temperature was also measured. The results obtained are shown in Table 2.

TABLE 2

| MOLDING CONDITIONS OBJECT OF EVALUATION | MOLD TEMPERATURE 40° C., COOLING TIME 60 SECONDS DEGREE OF DEFORMATION DURING ANNEALING TREATMENT | MOLD TEMPERATURE 80° C., COOLING TIME 120 SECONDS MOLDABILITY | MOLD TEMPERATURE 100° C., COOLING TIME 120 SECONDS MOLDABILITY | HEAT DISTORTION TEMPERATURE (° C. AT 1.80 MPa) |
|---|---|---|---|---|
| EXAMPLE 6 | A | A | A | 68 |
| EXAMPLE 7 | A | A | A | 70 |
| EXAMPLE 8 | A | A | A | 68 |
| EXAMPLE 9 | A | A | A | 67 |
| COMPARATIVE EXAMPLE 5 | C | C | C | — |
| COMPARATIVE EXAMPLE 6 | B | B | A | 63 |

Example 10

Polylactic acid pellets were obtained in the same manner as in Example 6, except that the content of the ethylene-bis-12-hydroxystearic acid amide was set at 1 wt %, the content of the organically modified layered clay mineral was set at 0.5 wt %, and the talc content was set at 5 wt %. After these pellets were dried to an absolutely dry state, square columnar test pieces (80 mm×10 mm×4 mm) were injection molded at a mold temperature of 100° C. and a cooling time of 120 seconds using injection molding machines (PS40E2ASE and FS75 manufactured by Nissei Jushi Kogyo K.K.). The heat distortion temperature (° C. at 0.45 MPa) and Izod impact strength (J/m) of the square columnar test pieces thus obtained were measured; the results obtained are shown in Table 3. Furthermore, the heat distortion temperature was measured by the same method as in Example 6, and the Izod impact strength was measured by an Izod impact test according to the method stipulated in ASTM D256.

Example 11

Polylactic acid pellets were obtained in the same manner as in Example 10, except that 10 wt % whiskers (wollastonite KAP-150, manufactured by Kansai Matec) were added in addition to the abovementioned low molecular weight compound having an amide group, layered clay mineral and talc. Using the polylactic acid pellets thus obtained, square columnar test pieces were molded in the same manner as in Example 10, and the heat distortion temperature and Izod impact strength were measured in the same manner as in Example 10. The results obtained are shown in Table 3.

Example 12

Polylactic acid pellets were obtained in the same manner as in Example 10, except that 10 wt % EPDM rubber (E700N, EPDM/acryl/styrene=70/10/20, manufactured by Ube Saikon) was added in addition to the abovementioned low molecular weight compound having an amide group, layered clay mineral and talc. Then, using the polylactic acid pellets thus obtained, square columnar test pieces were molded in the same manner as in Example 10, and the heat distortion temperature and Izod impact strength were measured in the same manner as in Example 10. The results obtained are shown in Table 3.

Example 13

Polylactic acid pellets were obtained in the same manner as in Example 10, except that 10 wt % whiskers (wollastonite KAP-150, manufactured by Kansai Matec) and 10 wt % EPDM rubber (E700N, EPDM/acryl/styrene=70/10/20, manufactured by Ube Saikon) were added in addition to the abovementioned low molecular weight compound having an amide group, layered clay mineral and talc. Then, using the polylactic acid pellets thus obtained, square columnar test pieces were molded in the same manner as in Example 10, and the heat distortion temperature and Izod impact strength were measured in the same manner as in Example 10. The results obtained are shown in Table 3.

TABLE 3

| OBJECT OF EVALUATION | HEAT DISTORTION TEMPERATURE (° C. AT 0.45 MPa) | IZOD IMPACT STRENGTH (J/m) |
|---|---|---|
| EXAMPLE 10 | 121 | 22 |
| EXAMPLE 11 | 133 | 17 |
| EXAMPLE 12 | 109 | 42 |
| EXAMPLE 13 | 118 | 31 |

As is clear from the results shown in Table 2, the abovementioned low molecular weight compound having an amide group, and the abovementioned layered clay mineral and talc, are all uniformly dispersed in the polylactic acid composite materials of the present invention obtained in Examples 6 through 9, and these composite materials show a greatly improved heat resistance, moldability and mold release characteristics compared to polylactic acid alone (Comparative Example 5) or a polylactic acid composite material in which a polylactic acid, a low molecular weight compound having an amide group and talc are mixed (Comparative Example 6).

Furthermore, as is clear from the results shown in Table 3, the heat resistance is further improved by adding whiskers to the polylactic acid in addition to the abovementioned low molecular weight compound having an amide group, organically modified layered clay mineral and talc. Furthermore, it was confirmed that the impact resistance is further improved by adding an EPDM rubber, and that the impact resistance can be further improved while maintain the heat resistance at a high level by adding both whiskers and an EPDM rubber.

In the present invention, as was described above, the crystallization rate of the polylactic acid is sufficiently increased by the synergistic effect of a low molecular weight compound having an amide group and a layered clay mineral that is organically modified by an organic onium salt so that heat resistance and moldability and mold release characteristics during the manufacture of a molded body can be achieved at a high level.

What is claimed is:

1. A polylactic acid composite material, comprising:
   a polylactic acid;
   a low molecular weight compound which has an amide group; and
   a layered clay mineral that has been organically modified using an organic onium salt.

2. The polylactic acid composite material according to claim 1, wherein the low molecular weight compound is a member selected from the group consisting of hydroxyamide, bis-amide and mixtures thereof.

3. The polylactic acid composite material according to claim 1, wherein the organic onium salt has hydroxy groups.

4. The polylactic acid composite material according to claim 1, further comprising talc.

5. The polylactic acid composite material according to claim 1, further comprising whiskers and/or an EPDM rubber.

6. A molded article which is obtained by molding the polylactic acid composite material according to claim 1.

7. The polylactic acid composite material according to claim 1, wherein said polylactic acid is a polymer having repeating units expressed by the following general formula (1):

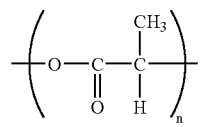

wherein n indicates an integer.

8. The polylactic acid composite material according to claim 1, wherein said polylactic acid is poly-D-lactic acid, poly-L-lactic acid, poly-DL-lactic acid or mixtures thereof.

9. The polylactic acid composite material according to claim 1, wherein said polylactic acid is a copolymer.

10. The polylactic acid composite material according to claim 1, wherein said polylactic acid is blended with a homopolymer of another polymerizable monomer.

11. The polylactic acid composite material according to claim 1, wherein said low molecular weight compound having an amide group is selected from the group consisting of lauric acid amide, palmitic acid amide, oleic acid amide, stearic acid amide, erucic acid amide, behenic acid amide, ricinolic acid amide, hydroxystearic acid amide, lactic acid amide, N-oleylpalmitic acid amide, N-oleyloleic acid amide, N-oleylstearic acid amide, N-stearyloleic acid amide, N-stearylstearic acid amide, N-stearylerucic acid amide, methylolstearic acid amide, methylolbehenic acid amide, methylene-bis-stearic acid amide, ethylene-bis-lauric acid amide, ethylene-bis-capric acid amide, ethylene-bis-oleic acid amide, ethylene-bis-stearic acid amide, ethylene-bis-erucic acid amide, ethylene-bis-behenic acid amide, ethylene-bis-isostearic acid amide, methylene-bis-12-hydroxystearic acid amide, hexamethylene-bis-12-hydroxystearic acid amide, ethylene-bis-12-hydroxystearic acid amide, butylene-bis-stearic acid amide, hexamethylene-bis-hydroxystearic acid amide, hexamethylene-bis-behenic acid amide, m-xylene-bis-12-hydroxystearic acid amide, N,N'-dioleylsebacic acid amide, N,N'-dioleyladipic acid amide, N,N'-distearyladipic acid amide, N,N'-distearylsebacic acid amide, N,N'-distearylisophthalic acid amide, N,N'-distearylterephthalic acid amide, stearic acid monoethanolamide, stearic acid diethanolamide, oleic acid monoethanolamide, oleic acid diethanolamide, N-butyl-N'-stearylurea, N-propyl-N'-stearylurea, N-stearyl-N'-stearylurea, N-phenyl-N'-stearylurea, xylene-bis-stearylurea, toluylene-bis-stearylurea, hexamethylene-bis-stearylurea, diphenylmethane-bis-stearylurea, diphenylmethane-bis-laurylurea and mixtures thereof.

12. The polylactic acid composite material according to claim 1, wherein said low molecular weight compound has a melting point of 20 to 230° C.

13. The polylactic acid composite material according to claim 1, wherein said low molecular weight compound is a monomeric compound.

14. The polylactic acid composite material according to claim 1, comprising 0.01 to 20 parts by weight of said low molecular weight compound, based on 100 parts by weight of said polylactic acid.

15. The polylactic acid composite material according to claim 1, wherein said layered clay mineral is a smectite mineral, a kaolinite mineral, a vermiculite mineral, a mica mineral or mixtures thereof.

16. The polylactic acid composite material according to claim 1, wherein said layered clay mineral has a cation exchange capacity of 30 to 300 meq/100 g.

17. The polylactic acid composite material according to claim 1, wherein an inter-layer distance of the layered clay mineral that is organically modified using an organic onium salt is 2.9 nm or greater based on the mean distance between the centers of gravity of the respective layers.

18. The polylactic acid composite material according to claim 1, comprising 0.01 to 20 parts by weight of the organically modified layered clay mineral, based on 100 parts by weight of said polylactic acid.

19. The polylactic acid composite material according to claim 1, wherein said low molecular weight compound having an amide group is selected from the group consisting of polyoxyethylenestearic acid amides, polyoxyethyleneoleic acid amides, and mixtures thereof.

* * * * *